(12) United States Patent
Chou et al.

(10) Patent No.: US 11,989,854 B2
(45) Date of Patent: May 21, 2024

(54) POINT-OF-VIEW IMAGE WARP SYSTEMS AND METHODS

(71) Applicant: Apple Inc., Cupertino, CA (US)

(72) Inventors: Jim C. Chou, San Jose, CA (US); Jian Zhou, Pleasanton, CA (US)

(73) Assignee: Apple Inc., Cupertio, CA (US)

( * ) Notice: Subject to any disclaimer, the term of this patent is extended or adjusted under 35 U.S.C. 154(b) by 152 days.

(21) Appl. No.: 17/356,223

(22) Filed: Jun. 23, 2021

(65) Prior Publication Data

US 2022/0414841 A1 Dec. 29, 2022

(51) Int. Cl.
*G06T 5/00* (2006.01)
*G06N 20/00* (2019.01)
*G06T 3/00* (2006.01)

(52) U.S. Cl.
CPC .............. *G06T 5/006* (2013.01); *G06N 20/00* (2019.01); *G06T 3/0093* (2013.01)

(58) Field of Classification Search
CPC ........ G06T 5/006; G06T 3/0093; G06N 20/00
See application file for complete search history.

(56) References Cited

U.S. PATENT DOCUMENTS

| | | | |
|---|---|---|---|
| 6,346,993 B1 | 2/2002 | Curry | |
| 10,055,812 B1 | 8/2018 | Huang | |
| 10,223,761 B2 | 3/2019 | Kwon et al. | |
| 11,373,271 B1* | 6/2022 | Da Silva Quelhas | .... G06T 7/50 |
| 2005/0243103 A1 | 11/2005 | Rudolph | |
| 2012/0039528 A1* | 2/2012 | Lee | ....... H04N 13/161 |
| | | | 382/162 |
| 2014/0241582 A1 | 8/2014 | Gaddy et al. | |
| 2015/0078435 A1 | 3/2015 | Taubman et al. | |
| 2015/0091900 A1* | 4/2015 | Yang | ..... G06V 40/162 |
| | | | 345/419 |
| 2017/0294006 A1* | 10/2017 | Cabral | ................. G06T 19/006 |
| 2018/0158246 A1* | 6/2018 | Grau | ..................... G06T 3/0093 |
| 2018/0315170 A1 | 11/2018 | Mills | |

(Continued)

FOREIGN PATENT DOCUMENTS

EP 3284061 B1 11/2021
JP 2013250059 A 12/2013

(Continued)

OTHER PUBLICATIONS

International Search Report & Written Opinion for PCT Application No. PCT/US2022/031833 dated Sep. 7, 2022; 10 pgs.

(Continued)

*Primary Examiner* — Charles T Shedrick
(74) *Attorney, Agent, or Firm* — Fletcher Yoder P.C.

(57) ABSTRACT

An electronic device may include an electronic display to display an image based on processed image data. The electronic device may also include image processing circuitry to generate the processed image data. The image processing circuitry may receive input image data corresponding to an image in a first perspective and warp the input image data from the first perspective to a second perspective, generating warped image data. Additionally, the image processing circuitry may determine one or more occluded regions in the second perspective and determine fill-data corresponding to the occluded regions. The processed image data may be generated by combining the warped image data and the fill-data.

20 Claims, 10 Drawing Sheets

(56) References Cited

U.S. PATENT DOCUMENTS

| | | |
|---|---|---|
| 2019/0037150 A1* | 1/2019 | Srikanth ............... H04N 23/62 |
| 2019/0277974 A1 | 9/2019 | Sahr |
| 2019/0340812 A1 | 11/2019 | Feutterling et al. |
| 2020/0020075 A1 | 1/2020 | Khwaja et al. |
| 2020/0242728 A1 | 7/2020 | Chang |
| 2020/0302688 A1 | 9/2020 | Hosfield et al. |
| 2020/0349683 A1 | 11/2020 | Allu et al. |
| 2021/0004933 A1 | 1/2021 | Wong et al. |
| 2022/0414824 A1* | 12/2022 | Chou .................... G06T 3/4007 |
| 2022/0414841 A1* | 12/2022 | Chou .................... G06T 3/0093 |

FOREIGN PATENT DOCUMENTS

| | | |
|---|---|---|
| JP | 2020102022 A | 7/2020 |
| KR | 10-2018-0030773 A | 3/2018 |
| WO | WO-2022179359 A1 * | 9/2022 |

OTHER PUBLICATIONS

Greisen, Pierre, et al.; "Spatially-varying image warping: Evaluations and VLSI Implements," VLSI-SoC 2012, Santa Cruz, CA, USA, Oct. 7-10, 2012, Revised Selected Papers 20. Springer Berlin Heidelberg, 2013 (Year: 2013).

Huang, Chung-Lin, et al.; "A new motion compensation method for image sequence coding using hierarchical grid interpolation." IEEE Transactions on circuits an systems for video technology 4.1 (1994): 42-52. (Year: 1994).

Salmi, Jussi, et al.; "Hierarchical grid transformation for image warping in th analysis of two-dimensional electrophoresis gels," Proteomics 2.11 (2002): 1504-1515. (Year: 2002).

International Search Report and Written Opinion for PCT Application No. PCT/US2022/027111 dated Aug. 10, 2022; 9 pgs.

* cited by examiner

POINT-OF-VIEW IMAGE WARP SYSTEMS AND METHODS

BACKGROUND

The present disclosure relates generally to image processing and, more particularly, to image warp operations correcting for a change in point-of-view.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data.

An image may be represented by image data defining areas with particular resolutions or distributions of pixel values. However, in some instances, it may be desirable to change the resolutions or distributions of the pixel values to account for different display scenarios. For example, image data may be warped to account for environmental surroundings, display characteristics, a viewer's point-of-view (POV) and other factors that may distort the perceived image to a viewer. Thus, before being displayed, the image data may be processed to warp the image using the desired changes to the amount or distribution of pixel values such that the perceived image is not distorted. However, at least in some instances, when warping for changes in POV, objects may be revealed for which no image data exists, which may lead to image artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some scenarios, an image may appear distorted when perceived by a viewer due to differences between the perspective with which the image was captured or rendered and the viewer's point-of-view (POV)/perspective. Furthermore, a viewer's POV (e.g., as determined based on location and/or eye-tracking) relative to the display may alter how the viewer perceives the image. For example, in augmented, virtual, or mixed reality devices, an image may be captured, previously or in real time, and displayed with or without augmentation to a viewer as if the image was reality. However, the image may have been captured with a POV different from that which the viewer would normally experience. For example, objects may appear shorter, taller, wider, smaller, or otherwise out of perspective relative to itself or other objects if the image is left uncorrected. Thus, before being displayed, the image data may be processed to warp the image such that the perceived image has reduced or no distortion.

A POV warp may assist in altering the image data such that, when displayed, the image appears from a perspective consistent with that of the viewer. Such a POV warp may also shift objects' relative positions and generate one or more occluded regions in the image. For example, a foreground object may shift in a POV warp such that a portion of the object or background is visible after the warp that was not previously a part of the input image. As such, in some embodiments, occluded regions may be filled-in by blending, generating new pixel values, or additional image captures (e.g., from additional cameras. Additionally or alternatively, in some embodiments, filling-in the occluded regions may utilize machine learning (e.g., deep learning) to estimate the missing pixel values.

Additionally, in some embodiments, the correction for the POV warp may utilize a pixel grid to map pixel locations in the input image data to the warped locations corrected for the viewer's POV. During generation of the pixel grid, occlusions may be identified as invalid regions having no input image data associated therewith. As the occluded regions will be filled-in with fill-data, the invalid regions may be ignored when warping and fetching image data to increase operational efficiency.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
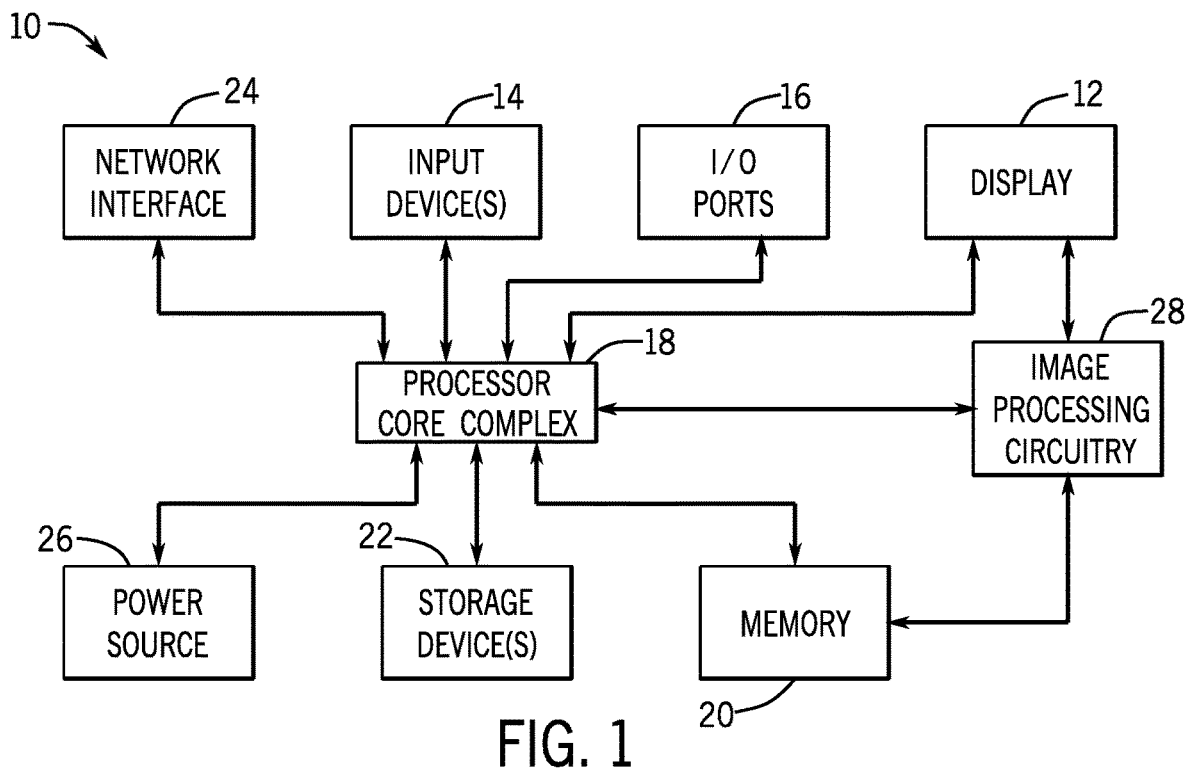
FIG. 1 is a block diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. An electronic display may take the form of a liquid crystal display (LCD), a light emitting diode (LED) display, an organic light emitting diode (OLED) display, a plasma display, or the like.

To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luma values.

In some scenarios, the image to be displayed may, if unaltered, appear distorted when perceived by a viewer. Distortions could be due to environmental effects, properties of the display, the viewer's point-of-view (POV) perspective, image processing warps such as shifts and scaling, and/or other distorting factors. For example, the display may include a screen, opaque or transparent, with curved edges and/or lensing effects that may distort an image if displayed without correction. Furthermore, a viewer's POV (e.g., as determined based on location and/or eye-tracking) relative to the display may alter how the viewer perceives the image. For example, in augmented reality (AR), virtual reality (VR), or mixed reality (MR) devices, an image may be captured, previously or in real time, and displayed with or without augmentation to a viewer as if the image was reality. However, the image may have been captured with a POV different from that which the viewer would normally experience if the image were reality. For example, objects may appear shorter, taller, wider, smaller, or otherwise out of perspective relative to itself or other objects. Thus, before being displayed, the image data may be processed to warp the image such that the perceived image has reduced or no distortion.

A POV warp may cause one or more occluded regions in the image. For example, a foreground object may shift in a POV warp such that a portion of the object or background is visible after the warp that was not previously a part of the input image. As such, in some embodiments, occluded regions may be filled-in by blending, generating new pixel values, additional image captures (e.g., from additional cameras), etc. Additionally or alternatively, in some embodiments, filling-in the occluded regions may utilize machine learning (e.g., deep learning) to estimate the missing pixel values.

In some embodiments, the correction for some types of warps, for example the POV warp may utilize a pixel grid to map pixel locations in the input image data to the warped locations corrected for the viewer's POV. However, warps that use a coarser grid may result in image artifacts, while finer grid warping may be taxing on processing bandwidth and/or take additional time. To avoid image artifacts and to increase efficiency, a hierarchical grid may have a variable grid partition size when performing the warp operation. In some embodiments, the hierarchical grid may have a quad-tree grid structure determined by reiteratively splitting grid partitions into fourths depending on image statistics associated with a corresponding portion of the image data. For example, the hierarchical grid may be determined by starting with 64×64 pixel partitions. Depending on the image statistics (e.g., homogeny, occlusions, perceived depth, edges, or other image features that may warrant finer warp calculations), that particular 64×64 partition of the grid may remain a full partition or the partition may be split into four partitions of 32×32 pixels. Each new partition may be maintained or further split depending on the image statistics until a desired granularity is reached. Furthermore, some partitions may be designated as invalid by being out of an active area of the display or as including an occlusion. As discussed herein invalid regions may be ignored for warp purposes to reduce bandwidth and filled-in separately, if necessary (e.g., in the active area).

With the coordinate mapping to the input image data for each partition, hierarchical interpolation may be used to obtain coordinates for each grid point. For example, coordinates corresponding to a 32×32 pixel partition may be interpolated from the 64×64 partition coordinates. Subsequently, coordinates corresponding to a 16×16 pixel partition may be interpolated from the 32×32 partition coordinates and so on until a coordinate mapping is determined for each grid point. Additionally, at each stage of interpolation, if the coordinates for a partition size is available (e.g., the grid was split into smaller than 64×64 partitions), coordinates for the corresponding pixels may be already calculated as part of the grid and may be directly used instead of interpolated.

By reducing warp calculations in partitions where artifacts are less likely and performing finer warp operations in certain regions based on the image statistics, processing time and/or bandwidth usage may be decreased while image quality is maintained. Moreover, the reduced processing time may provide for real-time or enhanced feedback to a user's change in position/POV. As should be appreciated, the grid sizing is given as an example and is non-limiting. Further, the disclosed techniques regarding the pixel grid may be used for any of multiple different image processing operations including but not limited to warps such as the POV warps, geometric distortion warps, temporal warps, etc. Indeed, other image processing operations may utilize a hierarchical grid structure for increased efficiency and/or reduced processing time. Accordingly, to improve image quality and/or increase efficiency, the present disclosure provides techniques for a general hierarchical grid and for enhanced POV warping.

One embodiment of an electronic device 10 that utilizes the hierarchical grid is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Additionally, the image processing circuitry 28 (e.g., a graphics processing unit, a display image processing pipeline, etc.) may be included in the processor core complex 18.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G, LTE, or 5G cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance of the sub-pixels based at least in part on corresponding image data. In some embodiments, the image data may be received from another electronic device, for example, via the network interface 24 and/or the I/O ports 16. Additionally or alternatively, the image data may be generated by the processor core complex 18 and/or the image processing circuitry 28. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
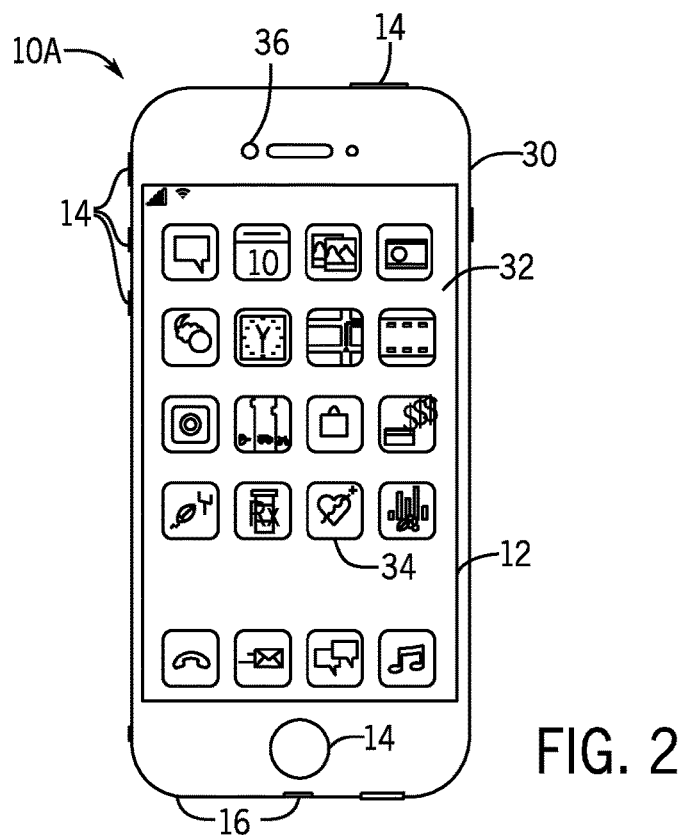
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like.

For example, the handheld device 10A may be a smart phone, such as an iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
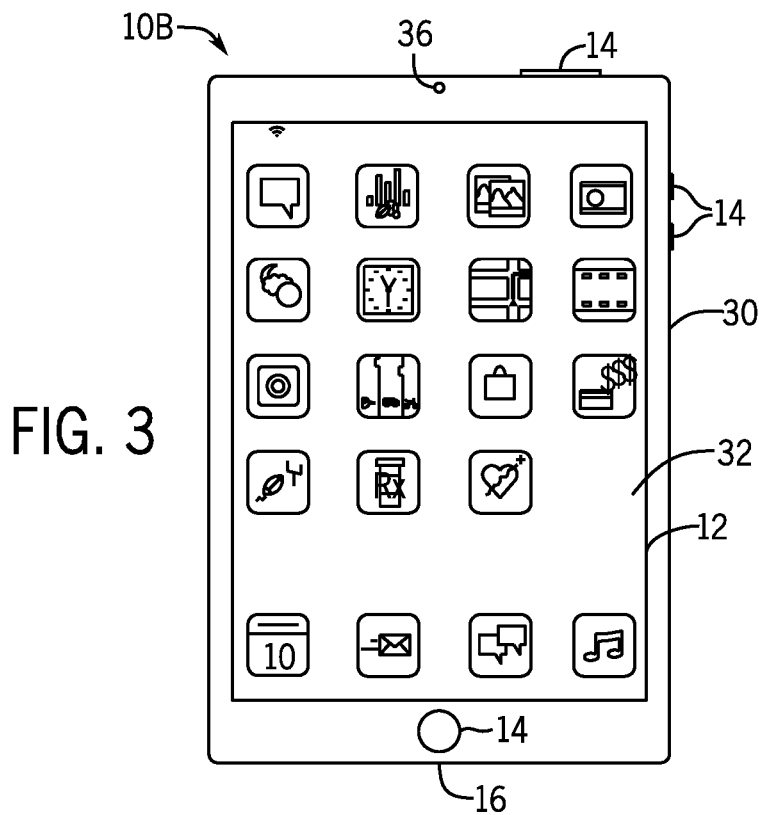
FIG. 3 is another example of the electronic device of FIG. 1 in the form of a tablet device, in accordance with an embodiment.
Figure 4:
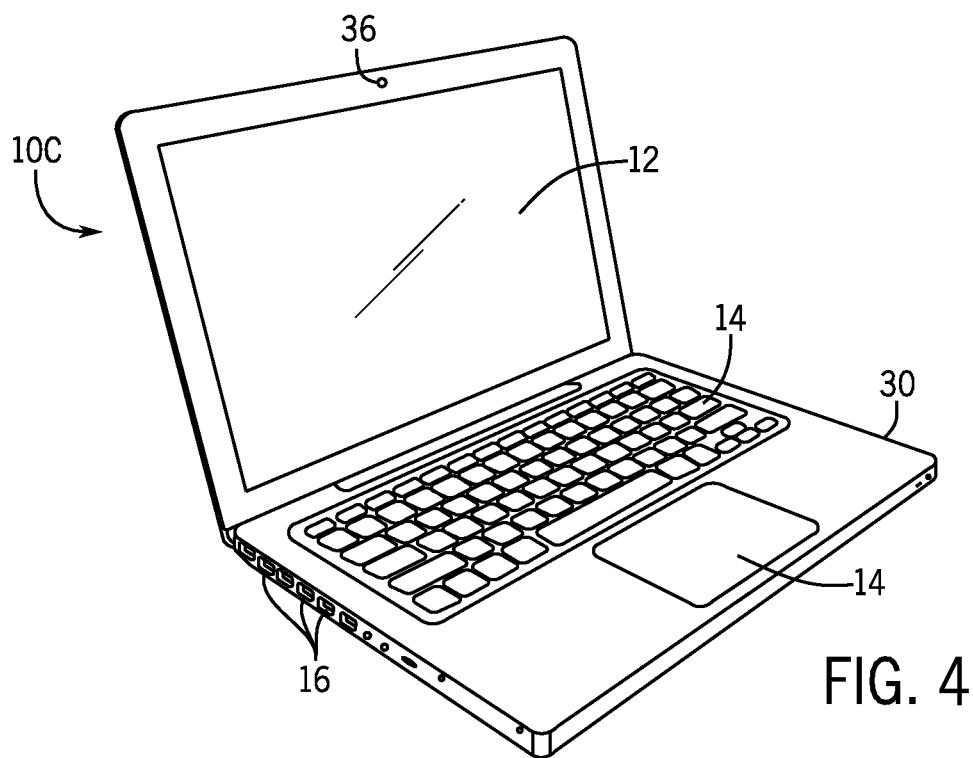
FIG. 4 is another example of the electronic device of FIG. 1 in the form of a computer, in accordance with an embodiment.
Figure 5:
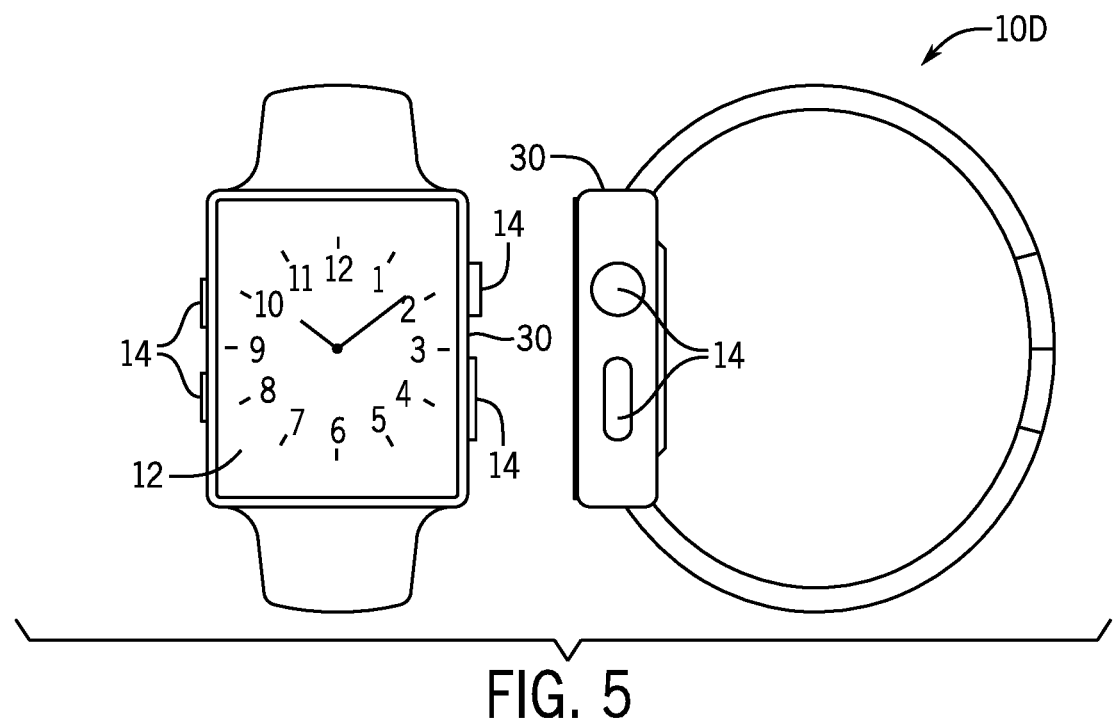
FIG. 5 is another example of the electronic device of FIG. 1 in the form of a watch, in accordance with an embodiment.

Another example of a suitable electronic device 10, specifically a tablet device 10B, is shown in FIG. 3. For illustrative purposes, the tablet device 10B may be an iPad® model available from Apple Inc. A further example of a suitable electronic device 10, specifically a computer 10C, is shown in FIG. 4. For illustrative purposes, the computer 10C may be a MacBook® or iMac® model available from Apple Inc. Another example of a suitable electronic device 10, specifically a watch 10D, is shown in FIG. 5. For illustrative purposes, the watch 10D may be an Apple Watch® model available from Apple Inc. As depicted, the tablet device 10B, the computer 10C, and the watch 10D each also includes an electronic display 12, input devices 14, I/O ports 16, and an enclosure 30.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 6:
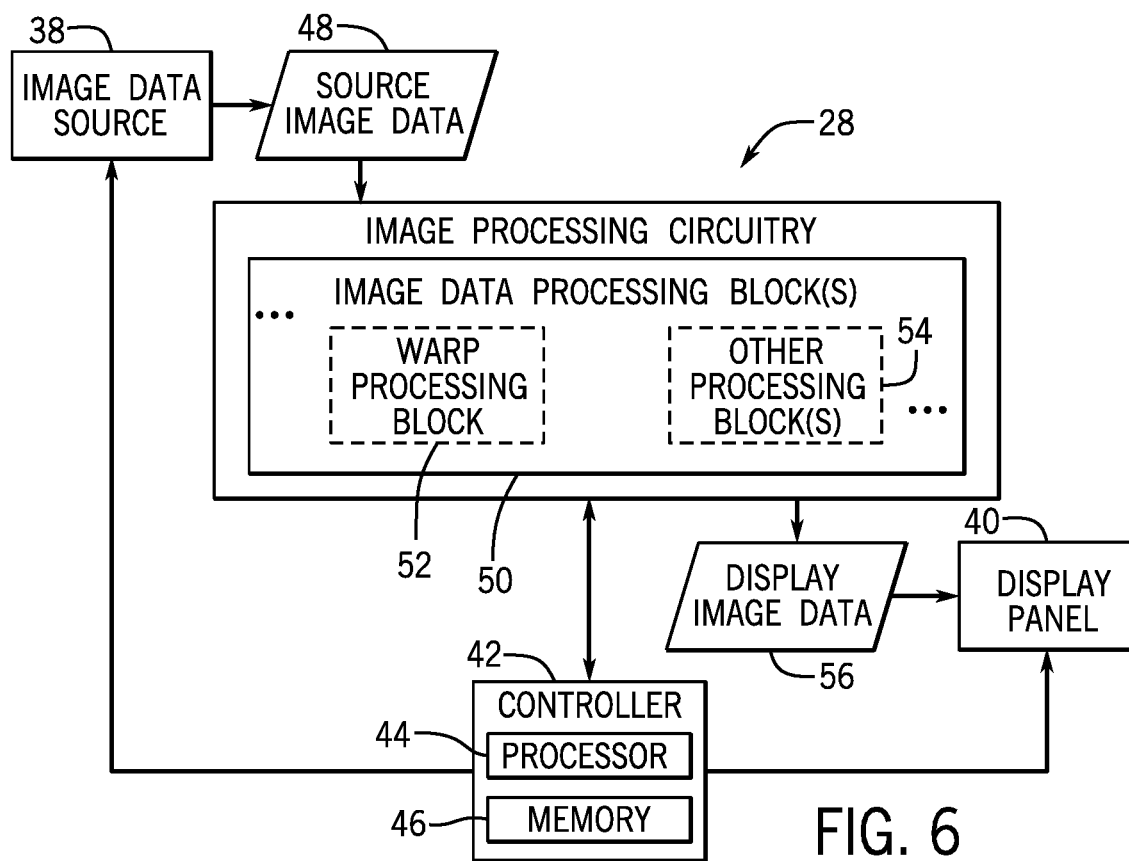
FIG. 6 is a block diagram of a display pipeline of the electronic device of FIG. 1 including a warp compensation block, in accordance with an embodiment.

To help illustrate, a portion of the electronic device 10, including image processing circuitry 28, is shown in FIG. 6. In some embodiments, the image processing circuitry 28 may be implemented by circuitry in the electronic device 10, circuitry in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a liquid crystal display (LCD), a light emitting diode (LED) display, an organic LED (OLED) display, or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an 8-bit fixed point αRGB format, a 10-bit fixed point αRGB format, a signed 16-bit floating point αRGB format, an 8-bit fixed point YCbCr format, a 10-bit fixed point YCbCr format, a 12-bit fixed point YCbCr format, and/or the like. In some embodiments, the image data source 38 may be included in the processor core complex 18, the image processing circuitry 28, or a combination thereof. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The data source 38 may include captured images from cameras 36, images stored in memory, graphics generated by the processor core complex 18, or a combination thereof. The image processing circuitry 28 may include one or more sets of image data processing blocks 50 (e.g., circuitry, modules, or processing stages) such as the warp processing block 52. As should be appreciated, multiple other processing blocks 54 may also be incorporated into the image processing circuitry 28, such as a color management block, a dither block, a rotate block, etc. Furthermore, in some embodiments, multiple warp processing blocks 52 may be used to provide separate warp operations for different applications of the image processing circuitry 28. For example, different warp processing blocks 52 may be used for image data from different image data sources 38 (e.g., captured images, graphically generated images, etc.). The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and while the term "block" is used herein, there may or may not be a logical separation between the image data processing blocks 50.

Figure 7:
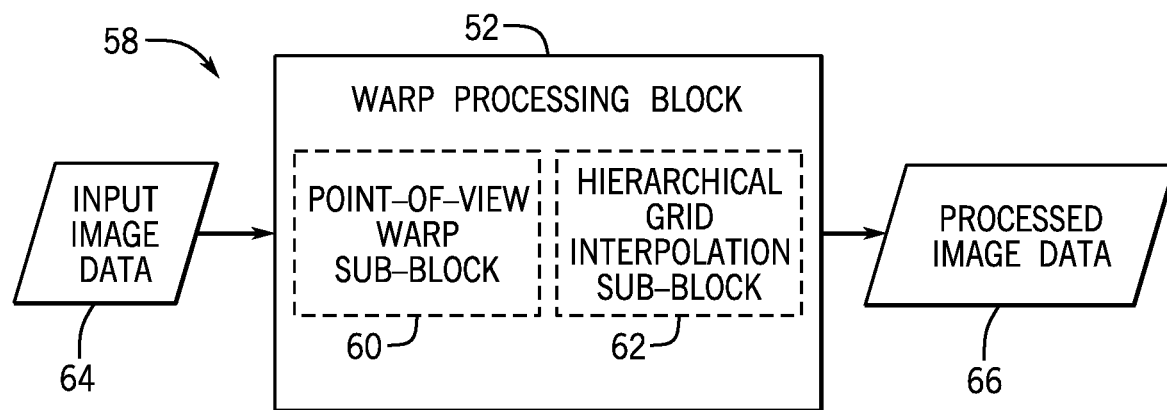
FIG. 7 is a block diagram of a warp processing block, in accordance with an embodiment.

The warp processing block 52 may facilitate improving perceived image quality by changing the amount (e.g., resolution) or distribution (e.g., shape, relative size, perspective, etc.) of pixel values to account for different display scenarios during one or more warp operations. To help illustrate, FIG. 7 is a block diagram 58 of a warp processing block 52 including a point-of-view (POV) warp sub-block 60 and a hierarchical grid interpolation sub-block 62. In general, the warp processing block 52 may receive input image data 64 and generate processed image data 66 by applying one or more warps to the input image data 64. As should be appreciated, the warp processing block 52 may include other warp sub-blocks for geometric warps, lens correction warps, temporal warps, etc. Moreover, the POV warp sub-block 60 may be combined (e.g., stacked) with one or more other warps in a combined warp operation.

The POV warp sub-block 60 may provide compensation for a viewer's POV (e.g., as determined based on location, eye relief, and/or focus) relative to the display as compared to the capture of the image to be displayed, for example via one or more cameras 36. Moreover, the viewer's POV may be monitored via any suitable method such as eye-tracking. Additionally, a height of the viewer may be determined based on a user input or a relative height difference between the electronic device 10 and an estimated position of the viewer with respect to the electronic device 10.

As non-limiting examples, augmented, virtual, or mixed reality devices, may capture images, previously or in real time, and display them with or without augmentation to a viewer as if the image was physically in view of the viewer. However, the image may have been captured with a perspective different from that which the viewer would normally experience, which may alter how the viewer perceives the image. For example, objects may appear shorter, taller, wider, smaller, or otherwise out of perspective relative to themselves or other objects. Thus, in some embodiments, the POV warp sub-block 60 may warp the image data before it is displayed such that the perceived image has reduced or no distortion.

Figure 8:
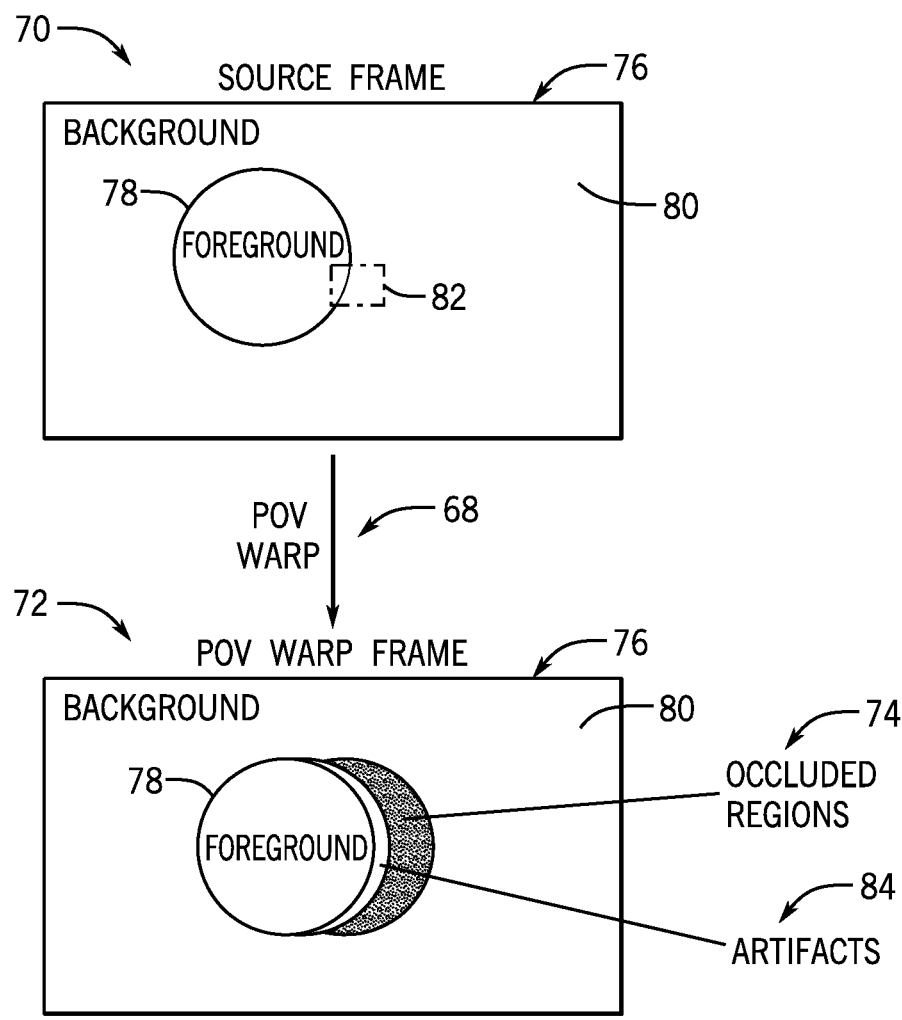
FIG. 8 is a schematic diagram of a point-of-view (POV) warp from a source frame to a POV warped frame, in accordance with an embodiment.

In some scenarios, a POV warp 68 from a source frame 70 (a.k.a. a source space) to a POV warped frame 72 (a.k.a. a warped space) may cause one or more occluded regions 74 in the image 76, as shown in FIG. 8. For example, a foreground object 78 may shift in a POV warp 68 such that a portion of the foreground object or the background 80 is visible after the POV warp 68 that was not previously a part of the image 76. As such, after the POV warp 68 there may be portions of the POV warped frame 72 that do not have mappings to the input image data 64 in the source frame 70.

In some embodiments, the warp processing block 52 may generate image data to fill-in an occluded region 74 in the POV warped frame 72. For example, the occluded region 74 may be filled-in by blending pixel values surrounding the occluded region 74 or by using image data from additional image captures such as images captured at a different time (e.g., before or after the original capture) from one or more different angles and/or by an additional image capture device (e.g., camera 36) having a different perspective. For example, in some embodiments, cameras 36 in stereo provide perspectives that may be combined to reduce or eliminate each other's occluded regions 74. In such a case, input image data 64 from the second camera 36 may undergo a POV warp 68 to the POV warped frame 72, and the portion corresponding to the occluded region 74 may be used as fill-data. Additionally or alternatively, in some embodiments, the warp processing block 52 may generating new pixel values to estimate and fill-in the pixel values of the occluded region 74 by utilizing painting algorithms and/or machine learning (e.g., deep learning).

Additionally, in some embodiments, sampling or resampling may occur with a window 82 that overlaps with or abuts edges of an occluded region 74. In some scenarios, filtering across occluded region 74 boundaries may generate artifacts 84. As such, in some embodiments, filtering may be reduced or eliminated for areas about the occluded region 74.

Figure 9:
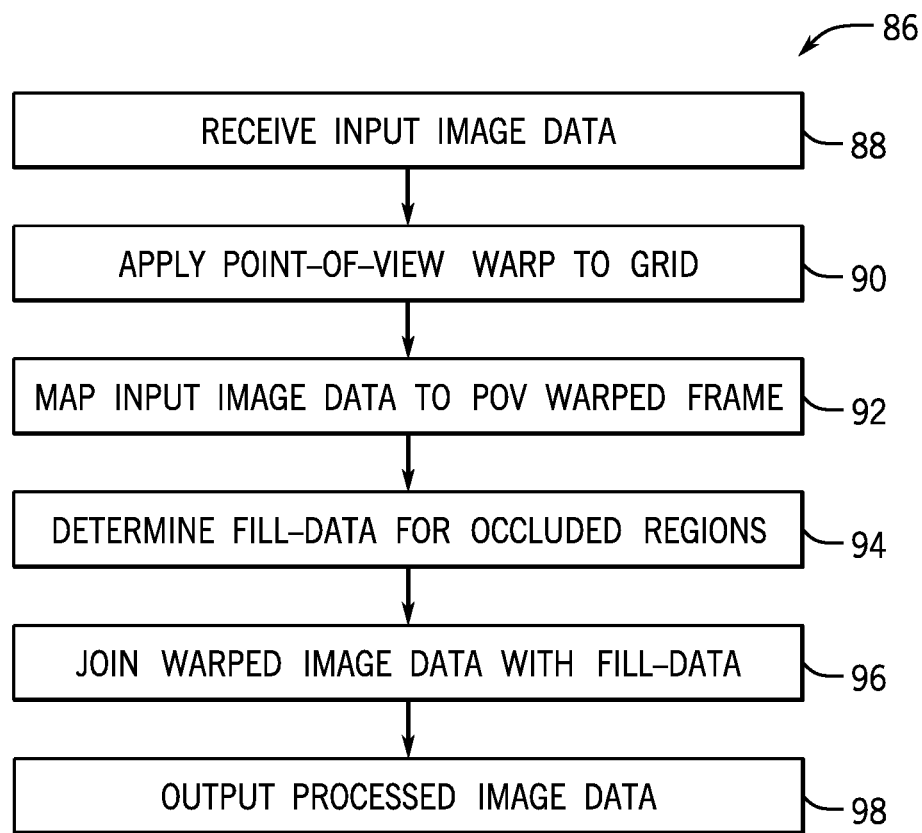
FIG. 9 a flowchart of an example process for determining POV warped image data, in accordance with an embodiment.

FIG. 9 is a flowchart of an example process 86 performed by the warp processing block 52. In general, the warp processing block 52 may receive input image data 64 and/or image statistics indicative thereof (process block 88). The warp processing block 52 may also apply a POV warp 68 to a pixel grid to generate a mapping of pixel locations in the source frame 70 to pixel locations in the POV warped frame 72 (process block 90). The input image data 64 may be mapped, according to the warped pixel grid coordinate values to the POV warped frame 72 (process block 92). Additionally, fill-data for occluded regions 74 may be determined (process block 94). The fill-data and the warped image data in the POV warped frame 72 may be joined (e.g., blended) to generate the processed image data 66 (process block 96), and the processed image data 66 may then be output (process block 98) to the other processing blocks 54 and/or the display panel 40.

In some embodiments, to apply different types of warps, for example the POV warp 68 and/or the warp processing block 52 may utilize a pixel grid to map the pixel locations in the source frame 70 to locations in the POV warped frame 72 corrected for the viewer's POV. Performing the warp on a pixel grid may increase efficiency by creating a mapping of pixel coordinates without fetching or processing all of the input image data. For example, after the POV warp 68 or other warp operation certain image data may be superfluous, and reducing or eliminating fetching and/or processing of unused data may increase efficiency. In general, the pixel grid may include grid points that define mappings to coordinates of the input image data 64 in the source frame 70 (i.e., source space). The mappings may be generated based on the POV warp 68, which may be accomplished in software or hardware. After determining the mappings, portions of the input image data 64, corresponding to the coordinate mappings of the grid points, may be fetched to resolve the pixel grid, generating the image 76 in the POV warped frame 72.

In some scenarios, a warp using a coarser grid may result in one or more image artifacts such as blurring. On the other hand, while a warp using a finer grid may provide increased clarity and reduced image artifacts, finer grids may be taxing on processing bandwidth and/or take additional time to render. As such, in some embodiments, the warp processing block 52 may utilize a hierarchical grid 100, as in FIG. 10. The hierarchical grid 100 may have variable size grid partitions 102A, 102B, 102C, 102D (cumulatively 102) when performing a warp operation. For example, each warped grid partition 102 may correlate a single pixel coordinate in the source frame 70 to a single pixel the warped frame (e.g., POV warped frame 72), such as a corner or center grid point of the grid partition 102. Depending on the granularity of the grid partition 102, the mapped coordinates to the source frame 70 for a number of other grid points (e.g., larger number for coarser/larger grid partitions 102 and smaller number for finer/smaller grid partitions 102) within the grid partition 102 may be interpolated (e.g., by the hierarchical grid interpolation sub-block 62).

In some embodiments, the hierarchical grid 100 may have a quad-tree grid structure determined by reiteratively splitting or merging grid partitions 102 by fourths depending on image statistics associated with a corresponding portion of the input image data 64. For example, the hierarchical grid 100 may be determined via a top-down split 104 starting with a uniform grid 106 of relatively larger grid partitions 102. The coarse uniform grid 106 may undergo zero, one, or more intermediate split partition stages 108 before arriving at the hierarchical grid 100. Additionally or alternatively, a hierarchical grid 100 may be generated by bottom-up merging 110. Bottom-up merging 110 may begin with a uniform grid 112 of relatively smaller grid partitions 102 that may undergo zero, one, or more intermediate merged partition stages 114 before arriving at the hierarchical grid 100. Moreover, the top-down split 104 and/or bottom-up merge 110 may be accomplished iteratively or in a single pass. Furthermore, a base partition 116 may be set depending on a desired maximum granularity that the coarse uniform grid 106 may start with during a top-down split 104. Similarly, in some embodiments, the bottom-up merge 110 may not merge to include grid partitions 102 larger than the base partition 116. Although discussed herein as having a quad-tree grid structure, the hierarchical grid 100 may use any suitable structure depending on implementation. For example, the structure of the hierarchical grid may bifurcate in halves, fourths, eighths, or any suitable fraction at each hierarchical tier/level.

Figure 10:
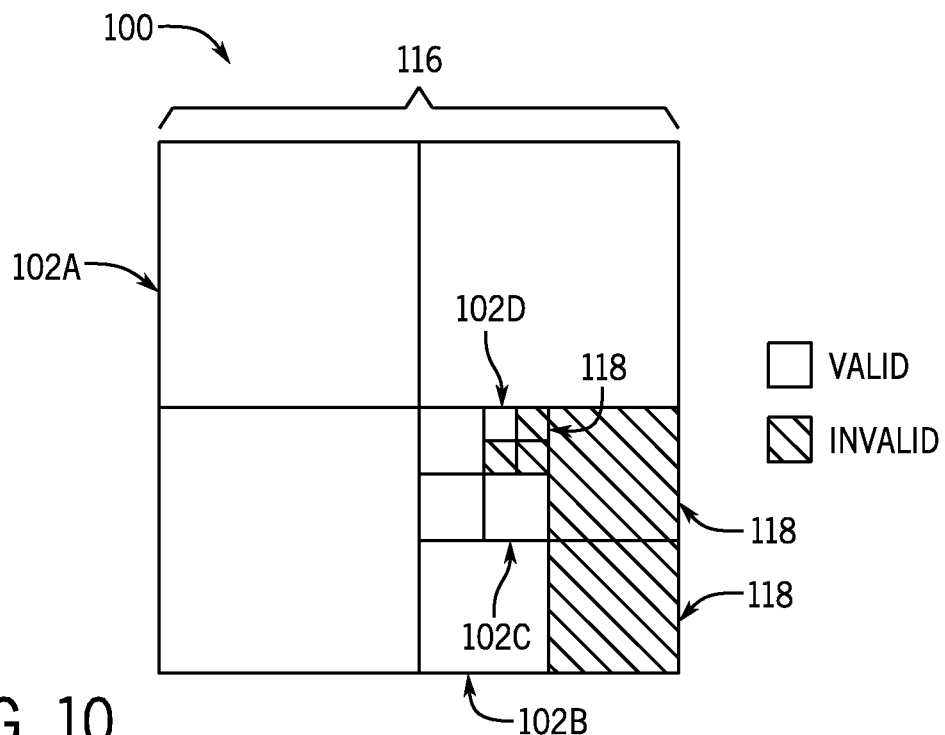
FIG. 10 is schematic diagram of a base partition of a hierarchical grid, in accordance with an embodiment.
Figure 12:
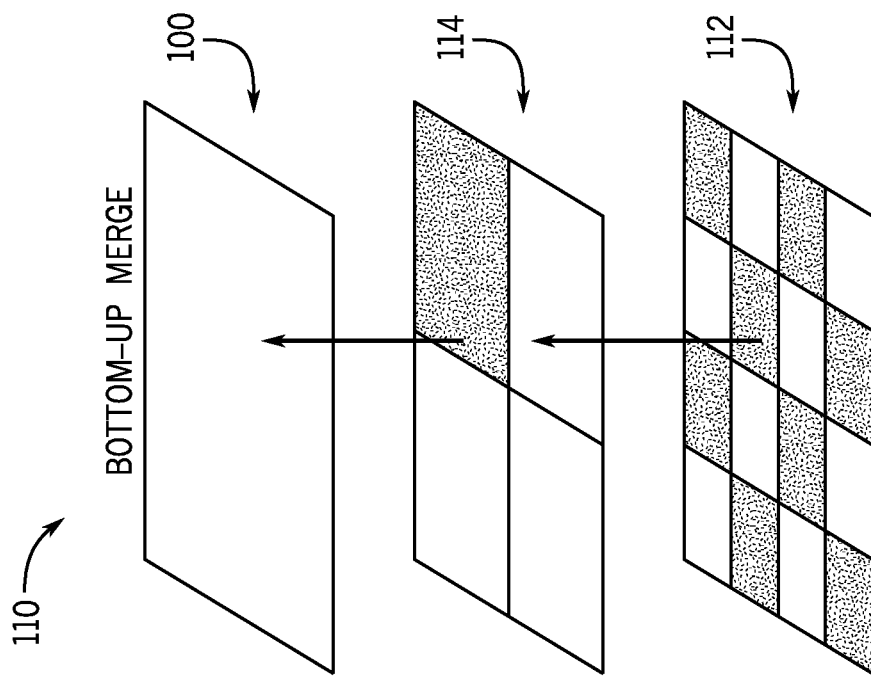
FIG. 12 is an example process for determining partitions of the hierarchical grid of FIG. 10, in accordance with an embodiment.
Figure 11:
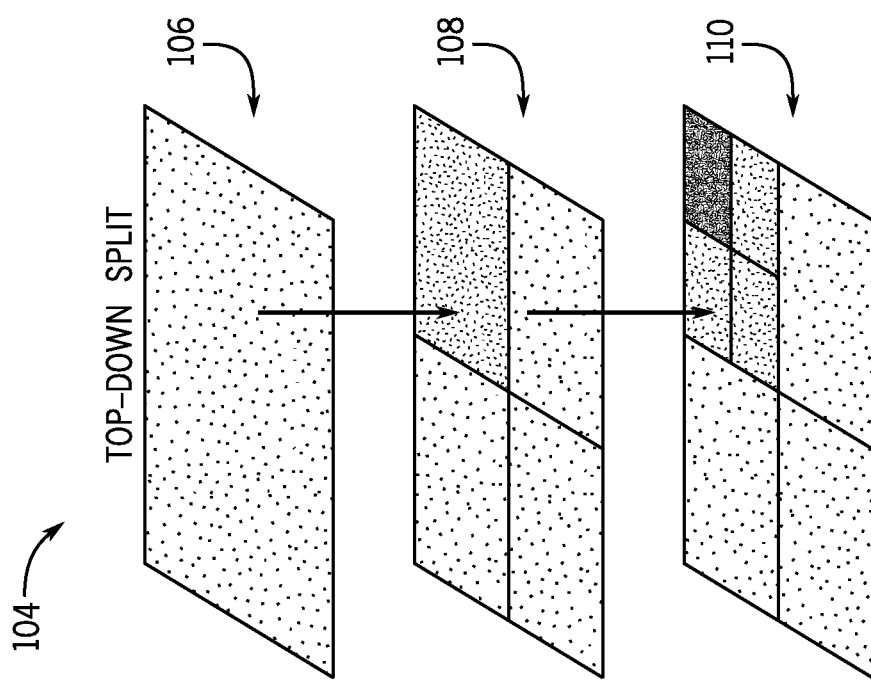
FIG. 11 is an example process for determining partitions of the hierarchical grid of FIG. 10, in accordance with an embodiment.
Figure 13:
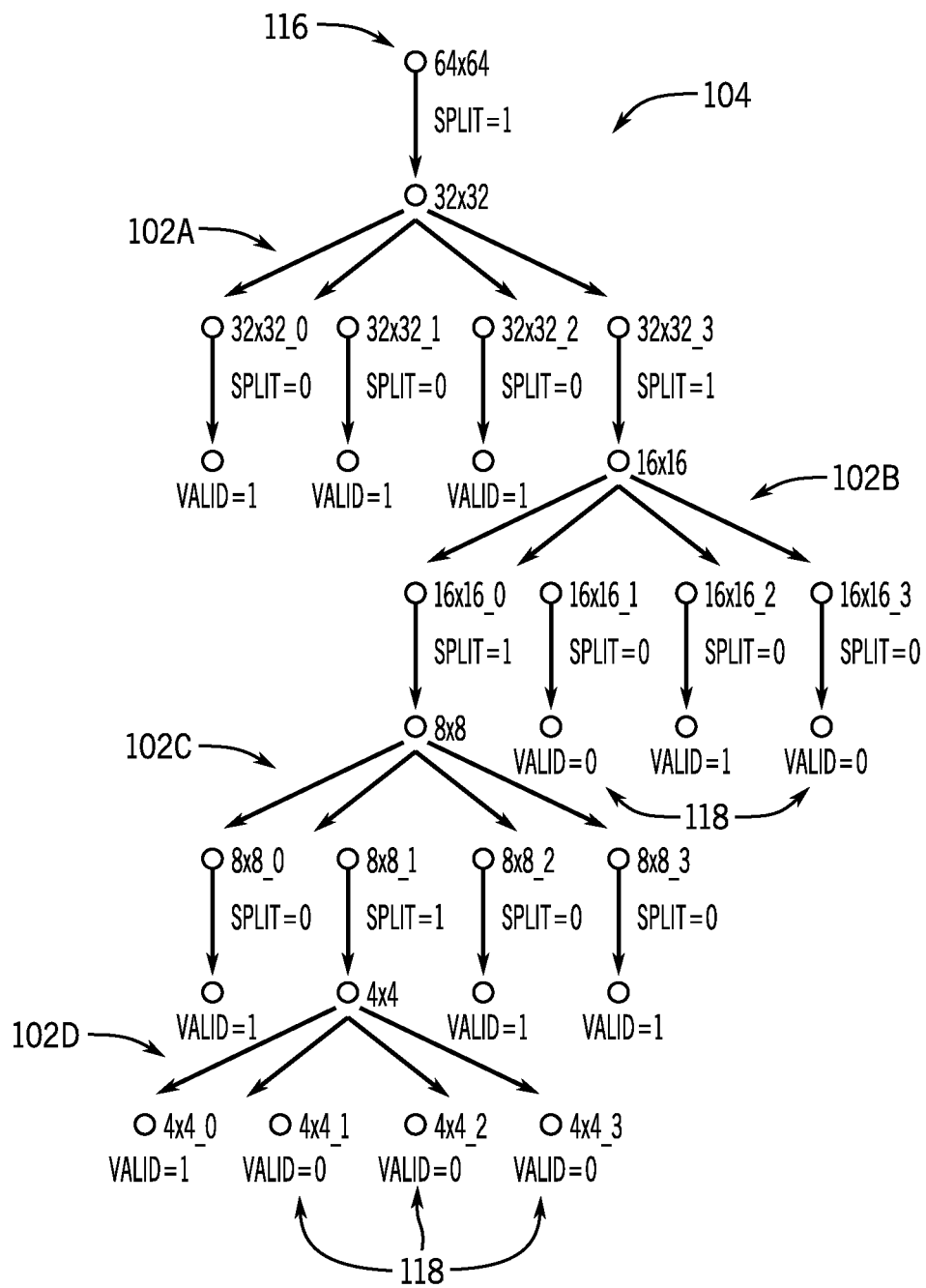
FIG. 13 is schematic diagram of an example process for determining partitions of the hierarchical grid of FIG. 10, in accordance with an embodiment.

To help further illustrate, FIG. 13 is a top-down split 104 of a 64×64 base partition 116 in accordance with FIG. 10. As should be appreciated, the size of the base partition 116 (e.g., 64×64), the smallest partition 102 (e.g., 4×4 grid partition 102D), and/or the step sizes of the splits or merger may vary depending on implementation such as bandwidth and/or image quality desires. In general, depending on the image statistics of corresponding input image data 64 (e.g., homogeny, occlusions, active area location, perceived depth, edges, and/or other image features that may warrant finer warp calculations), a particular base partition 116 may remain or be split into four 32×32 grid partitions 102A. Each new grid partition 102 may be maintained or further split depending on the image statistics until no more splits are desired or a smallest partition 102 is achieved. For example, if a grid partition 102 is generally homogenous and has no occlusions regions 74, the grid partition 102 may be maintained, whereas if a grid partition 102 has occlusions, is significantly non-homogenous (e.g., relative to a set or calculated parameter), or includes edges or changes in perceived depth greater than a set or calculated threshold amount, the grid partition 102 may be split to increase granularity in such areas of interest. In the depicted example, one 32×32 grid partition 102A is split into four 16×16 grid partitions 102B, and one of the 16×16 grid partitions 102B is split into four 8×8 grid partitions 102C.

In addition to modulating the granularity based on the image statistics for areas of interest relative to the input image data 64, the hierarchical grid 100 may also be partitioned based on an active area of the display 12. For example, the input image data 64 may include portions of the image 76 that lie outside the displayed portion (e.g., active area) of the image 76. In some embodiments, grid partitions 102 of the hierarchical grid 100 that are outside of the active area and/or correspond to occluded regions 74 may be designated as invalid region 118 or partition. In some embodiments, invalid region 118 may be ignored (e.g., corresponding input image data 64 not fetched) for warp purposes to reduce bandwidth usage and increase speed and efficiency.

When a warp (e.g., the POV warp 68, a geometric warp, a temporal warp, etc.) is applied to the hierarchical grid 100 by the POV warp sub-block 60 or the hierarchical grid interpolation sub-block 62, at least one characteristic grid point for each grid partition 102 is mapped to a pixel coordinate in the source frame 70 of the input image data 64. The mapping may be calculated in hardware or software based on POV parameters corresponding to the viewer's eye's location, eye relief, eye focus and/or other POV calculations relative to the display 12, image capturing mechanism (e.g., camera 36), or object of interest. As should be appreciated, more than one characteristic grid point may be mapped per grid partition 102 depending on implementation. Moreover, the characteristic grid point may be aligned with an edge, corner, or middle of the grid partition 102 for simplistic reference. For example, the characteristic grid point may be the top left corner grid point of each grid partition 102 and mapped to coordinates (e.g., "x" and "y" coordinates relative to a pixel grid of the input image data 64) in the source frame 70. Furthermore, while at the characteristic grid point mapping for each grid partition 102 is known (e.g., calculated), the additional grid points of the grid partitions 102 may be unknown from the partition mapping. As such, the hierarchical grid interpolation sub-block 62 may hierarchically interpolate between the known characteristic grid point coordinate mappings to determine the coordinates for the remaining grid point mappings.

Figure 14:
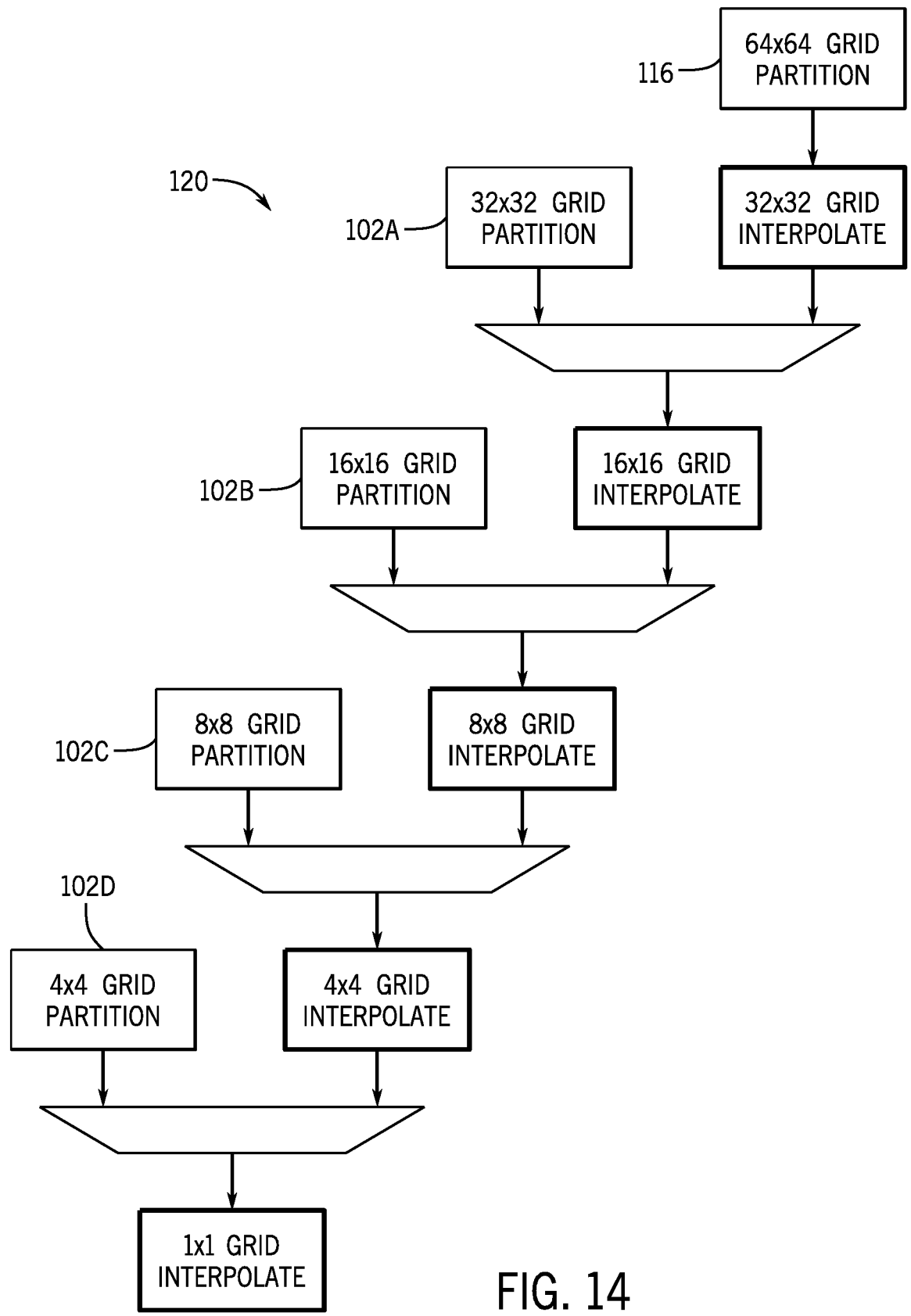
FIG. 14 is schematic diagram of an example hierarchical interpolation process, in accordance with an embodiment.

FIG. 14 is a schematic diagram 120 of the hierarchical interpolation beginning with a base partition 116 (e.g., 64×64 grid partition). In the case where the base partition 116 was not split into smaller grid partitions 102, the known x and y coordinates mappings for the characteristic grid points of multiple surrounding base partitions 116 may be used to interpolate midpoints between the known coordinate mappings of the characteristic grid points. Because of the construction of the hierarchical grid 100, such midpoints may be aligned with the characteristic grid points of the next tiered 32×32 grid partition 102A. As such, the characteristic grid points for the 32×32 grid partitions 102A and the base partition 116 may be determined. Further, the characteristic grid points of the base partition 116 and the 32×32 grid partitions 102A may be interpolated to determine the characteristic grid points for the 16×16 grid partitions 102B and so on until the characteristic grid points for the smallest grid partitions (e.g., 4×4 grid partitions 102D) are determined. However, when the base partition 116 has already been split into smaller grid partitions 102, at least some of the characteristic grid points for the smaller grid partitions may have already been calculated and, therefore, be available for completing the warped grid without interpolation. Indeed, at each tier of the hierarchical interpolation, known values may be input from their respective grid partitions (e.g., 102A-102D) and unknown values may be interpolated. In some embodiments, iterative interpolation may utilize previously interpolated coordinate mappings to interpolate additional coordinate mappings.

Furthermore, interpolation may continue until the coordinate mappings are interpolated for a 1×1 grid partition size, completing the mapping for each pixel position in the warped grid to the input image data 64 of the source frame 70. As should be appreciated, any suitable method for interpolation such as bilinear or bicurvature interpolation may be used to interpolate the coordinate mappings. In some embodiments, a more accurate interpolation (e.g., bicurvature interpolation) may be used while determining higher tier interpolations such as the 32×32 grid point interpolations and 16×16 grid point interpolations while lower tier interpolations such as the 1×1 grid interpolations may use more efficient interpolation methods such as bilinear interpolation. As should be appreciated, although stated herein as using "x" and "y" coordinates, any suitable coordinate system may be used to map the input image data 64 to warped image data such as the POV warped frame 72. Furthermore, in some embodiments, the "x" and "y" coordinates interpolations may be treated separately and to allow for parallel processing of the interpolations.

Figure 15:
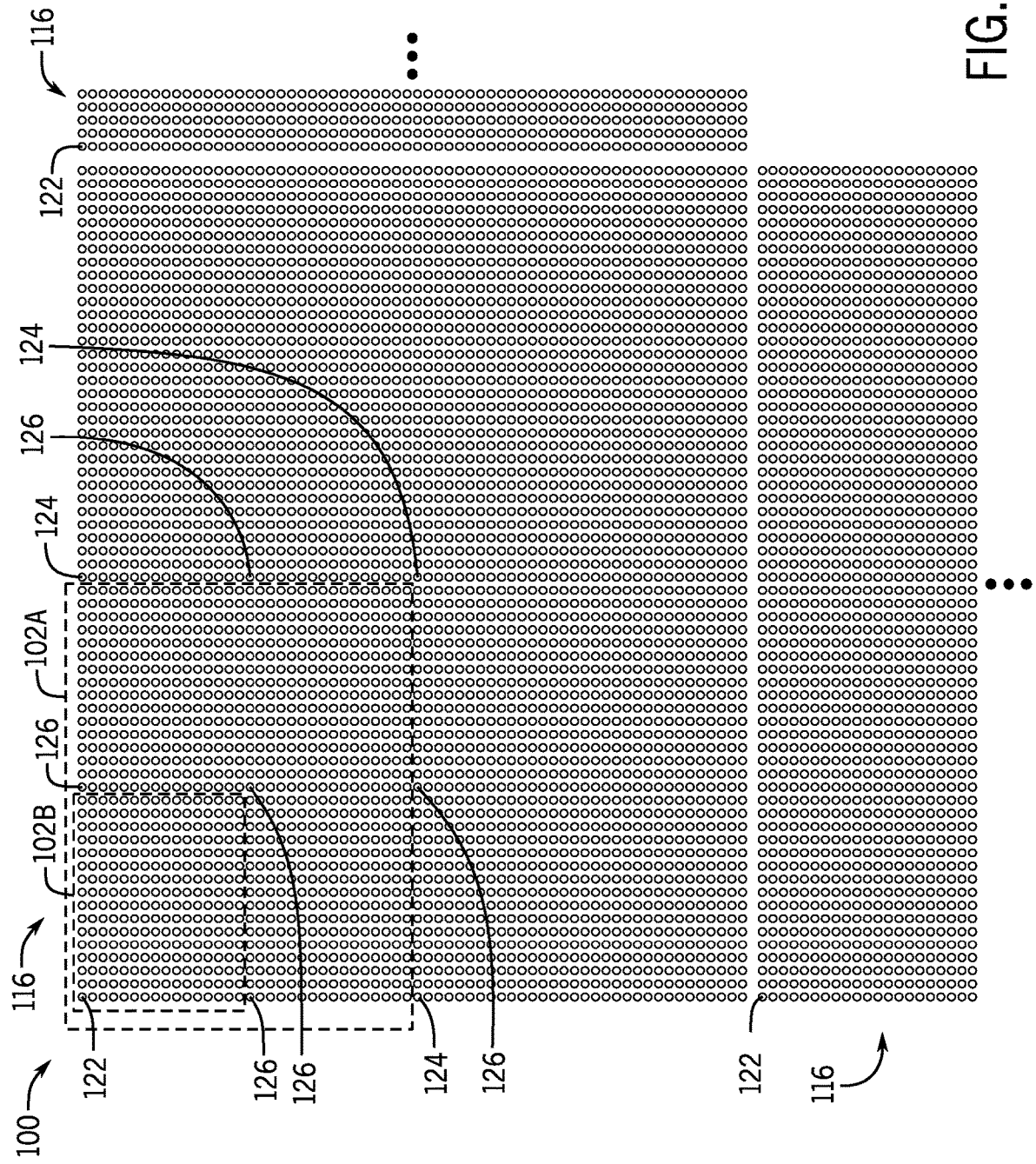
FIG. 15 is a schematic diagram of a hierarchical grid having multiple base partitions, in accordance with an embodiment.

To help further illustrate the hierarchical interpolation, FIG. 15 is a schematic diagram of a hierarchical grid 100 having multiple base partitions 116. As discussed above, the mappings for the characteristic grid points 122 for base partitions 116 may be calculated based on the warp from the source frame 70 to the destination frame (e.g., POV warped frame 72 or other warped frame). In the case where the base partition 116 was not split into smaller grid partitions 102, the known x and y coordinates mappings for the characteristic grid points 122 of the base partitions 116 may be used to interpolate grid points halfway between them. Because of the construction of the hierarchical grid 100, such interpolated grid points may be aligned with the characteristic grid points 124 of the next tiered grid partition 102, such as the 32×32 grid partition 102A. As such, the characteristic grid points 124 for the 32×32 grid partitions 102A and the base partition 116 may be known after the first level of interpolation. Additionally, if one or more of the base partitions 116 were split into 32×32 grid partitions 102A or smaller grid partitions 102B-102D, some of the characteristic grid points 124 for the 32×32 grid partitions 102A may already be known from the warp calculation. In some embodiments, interpolations for grid points previously calculated may be skipped or performed and ignored in favor of the warp calculated grid points.

Using the characteristic grid points 122 of the base partitions 116 and the characteristic grid points 124 for the 32×32 grid partitions 102A, the characteristic grid points 126 for the 16×16 grid partitions 102B may be interpolated. As with the 32×32 grid partitions 102A, if one or more base partitions 116 were split into 16×16 grid partitions 102B or smaller grid partitions 102C, 102D, some of the characteristic grid points 126 for the 16×16 grid partitions 102B may already be known from the warp calculation. The iterated interpolations may continue at each tier of the hierarchical interpolation until mappings for each grid point are determined, either from the warp operation or by interpolation.

Additionally, while depicted as the upper-left-most grid point, as should be appreciated, any relative position within the base partition 116 and grid partitions 102 may be used as characteristic grid points 122, 124, 126. Furthermore, as mentioned above, although the base partition 116 is exampled by a 64×64 grid partition, any suitable size base partition 116 may be utilized with iterated interpolations occurring until each grid point is resolved.

Figure 16:
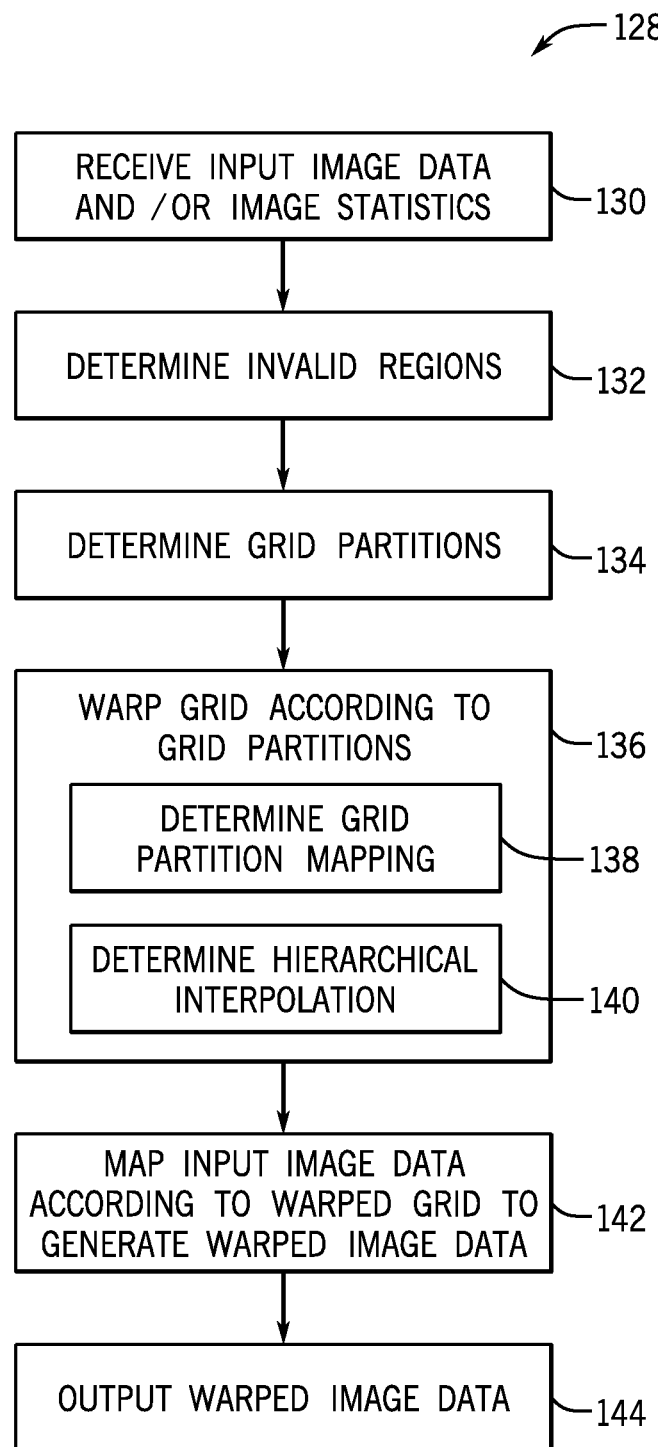
FIG. 16 is a flowchart of an example process for using a hierarchical grid in mapping a warp operation from a source frame to a warped frame, in accordance with an embodiment.

FIG. 16 is a flowchart of an example process 128 for using a hierarchical grid 100 in mapping a warp operation from a source frame 70 to a warped frame such as the POV warped frame 72. The image processing circuitry 28, such as warp processing block 52, may receive input image data 64 and/or image statistics based on the input image data 64 (process block 130). In some embodiments, the warp processing block 52 may determine the image statistics on-the-fly and/or receive the image statistics from another processing block 54. The image processing circuitry 28 may also determine invalid regions 118 (process block 132) and the grid partitions 102 of the hierarchical grid 100 (process block 134). For example, occluded regions 74 and/or regions outside an active area of the display 12 may be deemed invalid, and, in some embodiments, no input image data 64 corresponding to the invalid regions 118 may be fetched to save bandwidth. Moreover, the grid partitions 102 may be determined based on the image statistics which may include whether a region is invalid and/or if edge effects, changes in perceivable depth, or homogeneity, or other image features exist in the region. Further, the hierarchical grid 100 may be warped according to the grid partitions 102 (process block 136). Warping the hierarchical grid may include determining mappings for characteristic grid points of the grid partitions 102 to the source frame 70 (process block 138) and determining hierarchical interpolations (process block 140). The image processing circuitry 28 may then map the input image data 64 according to the warped grid to generate the warped image data (process block 142), and the warped image data may be output (process block 144). As should be appreciated, applying the mappings of the input image data 64 from the source frame 70 to a destination frame (e.g., a warped frame) may include applying the mappings of the warped grid to the input image data 64 or fetching the values of the corresponding input image data 64 mapped in the warped grid and assembling them in place of the warped grid. In some embodiments, occluded regions 74 or other invalid regions 118, if present, may be filled-in by blending surrounding pixel values, by using image data from additional image captures such as images captured at a different time or an additional camera 36 having a different perspective, and/or by generating new image data based on characteristics of the image 76. As such, processed image data 66 may be output for additional image processing or as display image data 56.

By reducing warp calculations in partitions where artifacts are less likely and performing finer warp operations in certain regions based on the image statistics, processing time and/or bandwidth usage may be decreased while image quality is maintained. Accordingly, the present techniques for a general hierarchical grid and for enhanced POV warping improve image quality and/or increase efficiency provide for real-time or enhanced feedback to a user's change in position/POV.

Although the above referenced flowcharts are shown in a given order, in certain embodiments, process/decision blocks may be reordered, altered, deleted, and/or occur simultaneously. Additionally, the referenced flowcharts are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
an electronic display configured to display an image based at least in part on processed image data; and
image processing circuitry configured to:
  receive input image data corresponding to the image in a first perspective;
  warp the input image data from the first perspective to a second perspective to generate warped image data;
  determine one or more occluded regions in the second perspective;
  determine fill-data corresponding to the one or more occluded regions, wherein determining the fill-data for an occluded region of the one or more occluded regions comprises:
    receiving second input image data corresponding to the image in a third perspective;
    warping the second input image data from the third perspective to the second perspective to generate second warped image data; and
    selecting a portion of the second warped image data corresponding to the occluded region as the fill-data; and
  generate the processed image data by combining the warped image data and the fill-data.

2. The electronic device of claim 1, wherein the one or more occluded regions comprises portions of the image in the second perspective not visible in the first perspective.

3. The electronic device of claim 1, wherein the image processing circuitry is configured to determine a pixel grid in a space indicative of the second perspective, wherein grid points of the pixel grid define mappings from the first perspective to the second perspective.

4. The electronic device of claim 3, wherein the image processing circuitry is configured to designate one or more portions of the pixel grid corresponding to the one or more occluded regions as invalid regions.

5. The electronic device of claim 4, wherein warp operations are not applied to the invalid regions, and wherein the input image data is not fetched for the invalid regions.

6. The electronic device of claim 4, wherein warping the input image data comprises determining the mappings from the first perspective to the second perspective and fetching portions of the input image data according to the mappings to resolve the pixel grid.

7. The electronic device of claim 1, comprising two or more cameras, wherein the input image data and the second input image data are generated based on image captures from different cameras of the two or more cameras.

8. The electronic device of claim 1, wherein determining the fill-data for the occluded region of the one or more occluded regions comprises blending a portion of the warped image data or a portion of the input image data along a perimeter of the occluded region.

9. A method comprising:
receiving, via image processing circuitry, input image data corresponding to a first point-of-view (POV) of an image;
warping the input image data from the first POV to a second POV to generate warped image data, wherein warping the input image data comprises determining a pixel grid in a space indicative of the second POV, wherein grid points of the pixel grid define mappings from the first POV to the second POV;
determining an occluded region in the second POV, wherein the occluded region comprises a portion of the image in the second POV not visible in the first POV;
determining fill-data corresponding to the occluded region; and
generating processed image data by combining the warped image data and the fill-data.

10. The method of claim 9, comprising:
analyzing image characteristics surrounding the occluded region;
estimating a portion of the image corresponding to the occluded region based at least in part on the analyzed image characteristics; and
determining the fill-data based at least in part on the estimated portion of the image.

11. The method of claim 10, comprising estimating the portion of the image corresponding to the occluded region based at least in part on the analyzed image characteristics via a painting algorithm.

12. The method of claim 9, comprising reducing sampling or resampling in the occluded region.

13. The method of claim 12, wherein determining the fill-data for the occluded region comprises:
analyzing, via a machine learning algorithm, image characteristics surrounding the occluded region; and
estimating, via the machine learning algorithm the portion of the image corresponding to the occluded region based at least in part on the analyzed image characteristics.

14. The method of claim 9, wherein warping the input image data comprises interpolating pixel values of the processed image data based on the pixel grid, wherein the pixel grid comprises a hierarchical grid.

15. Image processing circuitry configured to:
receive input image data corresponding to an image in a first space indicative of a first point-of-view (POV);
determine a pixel grid in a second space indicative of a second POV based at least in part on a warp from the first space to the second space, wherein grid points of the pixel grid define mappings to coordinates of the input image data in the first space;
fetch portions of the input image data based at least in part on the mappings to the coordinates of the input image data; and
generate warped image data in the second space based at least in part on the fetched portions of the input image data according to the pixel grid.

16. The image processing circuitry of claim 15, wherein the image processing circuitry is configured to:
determine an occluded region in the second space, wherein the occluded region comprises a portion of the image in the second POV not visible in the first POV; and
determine fill-data corresponding to the occluded region, wherein the fill-data estimates the image in the second POV at a location of the occluded region.

17. The image processing circuitry of claim 16, wherein the image processing circuitry is configured to generate processed image data in the second space by blending the warped image data and the fill-data.

18. The image processing circuitry of claim 16, wherein determining the fill-data for the occluded region comprises blending a portion of the warped image data or a portion of the input image data along a perimeter of the occluded region.

19. The image processing circuitry of claim 15, wherein the pixel grid comprises a hierarchical quad-tree grid.

20. An electronic device comprising:
   an electronic display configured to display an image based at least in part on processed image data; and
   image processing circuitry configured to:
      receive input image data corresponding to the image in a first perspective;
      warp the input image data from the first perspective to a second perspective to generate warped image data;
      determine one or more occluded regions in the second perspective;
      determine fill-data corresponding to an occluded region of the one or more occluded regions, wherein the occluded region comprises a portion of the image in the second perspective not visible in the first perspective, wherein determining the fill-data for the occluded region of the one or more occluded regions comprises:
         analyzing, via a machine learning algorithm, image characteristics surrounding the occluded region; and
         estimating, via the machine learning algorithm, the portion of the image corresponding to the occluded region based at least in part on the analyzed image characteristics; and
      generate the processed image data by combining the warped image data and the fill-data.

* * * * *